(12) United States Patent
Armitage et al.

(10) Patent No.: US 10,679,003 B2
(45) Date of Patent: *Jun. 9, 2020

(54) ASSISTING WITH WRITTEN COMMUNICATION STYLE BASED ON RECIPIENT DRESS STYLE

(71) Applicant: INTERNATIONAL BUSINESS MACHINES CORPORATION, Armonk, NY (US)

(72) Inventors: Joshua H. Armitage, Ellenbrook (AU); Michael C. Froend, Bicton (AU); Christine A. Jenkins, Attadale (AU); Mohammad Zanjani, Woodvale (AU)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/456,992

(22) Filed: Jun. 28, 2019

(65) Prior Publication Data

US 2019/0325017 A1 Oct. 24, 2019

Related U.S. Application Data

(63) Continuation of application No. 15/491,363, filed on Apr. 19, 2017, now Pat. No. 10,387,566.

(51) Int. Cl.
*G06F 40/253* (2020.01)
*G06K 9/00* (2006.01)
*G06F 40/30* (2020.01)
*G06F 40/103* (2020.01)

(52) U.S. Cl.
CPC .......... *G06F 40/253* (2020.01); *G06F 40/103* (2020.01); *G06F 40/30* (2020.01); *G06K 9/00362* (2013.01); *G06K 9/00369* (2013.01)

(58) Field of Classification Search
CPC .......... G06F 3/0416; G06F 2203/04106; G06F 3/011; G06F 3/041; G06F 3/0418;
(Continued)

(56) References Cited

U.S. PATENT DOCUMENTS 9,141,689 B2 9/2015 Chen
9,436,676 B1 9/2016 Korn
(Continued)

FOREIGN PATENT DOCUMENTS

WO 2015126954 A1 8/2015
WO 2016166417 A1 10/2016

OTHER PUBLICATIONS

Mell et al., "The NIST Definition of Cloud Computing," National Institute of Standards and Technology, Sep. 2011, p. 1-3, Special Publication 800-145.
(Continued)

*Primary Examiner* — Huyen X Vo
(74) *Attorney, Agent, or Firm* — James W. Kappos

(57) ABSTRACT

A method, computer system, and a computer program product for altering a written communication based on a dress style associated with a recipient is provided. The present invention may include receiving a plurality of visual data associated with the recipient. The present invention may also include analyzing the received plurality of visual data. The present invention may then include determining the dress style associated with the recipient based on the analyzed plurality of visual data. The present invention may further include retrieving a writing style associated with the recipient from a knowledge base based on the determined dress style. The present invention may also include generating a plurality of writing guidelines based on the retrieved writing style associated with the recipient.

1 Claim, 6 Drawing Sheets

(58) Field of Classification Search
CPC .............. G06F 3/044; G06F 3/046; G06F 2203/04808; G06F 3/04883; G06F 16/337; G06F 16/951; G06F 16/9535; G06F 2203/04101; G06F 3/016; G06F 3/017; G06F 3/03545; G06F 3/0414; G06F 3/045; G06F 3/0488; G06F 21/34; G06F 21/554; G06F 21/57; G06F 21/575; G06F 21/64; G06F 21/71; G06F 21/73; G06F 21/74; G06F 21/78; G06F 17/27; G06F 17/2785; G06F 17/28; G06F 1/16; G06F 3/042; G06F 3/0481; G06F 16/254; G06F 16/283; G06F 17/21; G06F 17/2715; G06F 17/274; G06F 3/0233; G06F 3/048; G06F 16/583; G06F 16/955; G06F 3/005

See application file for complete search history.

(56) References Cited

U.S. PATENT DOCUMENTS

| 10,083,168 | B1 | 9/2018 | Armitage |
| 2006/0069728 | A1 | 3/2006 | McEvilly |
| 2013/0071030 | A1* | 3/2013 | Weitzman ............ A61B 5/167 382/187 |
| 2015/0286617 | A1 | 10/2015 | Chakra |
| 2015/0286619 | A1 | 10/2015 | Chakra et al. |
| 2016/0147731 | A1 | 5/2016 | Parikh et al. |
| 2016/0232922 | A1 | 8/2016 | Hickey |
| 2018/0307668 | A1 | 10/2018 | Armitage |

OTHER PUBLICATIONS

Roztayger, "Designer Match," Rortayger: Modern Luxury Bags & Accessories, p. 1-2, http://rortayger.com/match/designer, Accessed on Feb. 15, 2017.

Satrapa et al., "Influence of Style of Dress on Formation of First Impressions," Perceptual and Motor Skills, 1992, p. 159-162, No. 74.

IBM, "List of IBM Patents or Patent Applications Treated as Related (Appendix P)," Jun. 28, 2019, p. 1-2.

Armitage et al., "Assisting With Written Communication Style Based on Recipient Dress Style," Application and Drawings, filed Jun. 27, 2019, 32 Pages, U.S. Appl. No. 16/454,724.

* cited by examiner

US 10,679,003 B2

ASSISTING WITH WRITTEN COMMUNICATION STYLE BASED ON RECIPIENT DRESS STYLE

BACKGROUND

The present invention relates generally to the field of computing, and more particularly to computational linguistics.

Written communication has become a major, and, in many instances, exclusive form of communication in various settings, including the workplace. Therefore, it is important to effectively communicate to others particularly, unfamiliar recipients, in a way that is easily understood and received favorably by the recipient. If the user gains invaluable insight on the recipient's age, gender, personality, socioeconomic status, values and political ideologies, then the user would be able to craft a favorable and easily understood written communication to the recipient.

SUMMARY

Embodiments of the present invention disclose a method, computer system, and a computer program product for altering a written communication based on a dress style associated with a recipient. The present invention may include receiving a plurality of visual data associated with the recipient. The present invention may also include analyzing the received plurality of visual data. The present invention may then include determining the dress style associated with the recipient based on the analyzed plurality of visual data. The present invention may further include retrieving a writing style associated with the recipient from a knowledge base based on the determined dress style. The present invention may also include generating a plurality of writing guidelines based on the retrieved writing style associated with the recipient.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
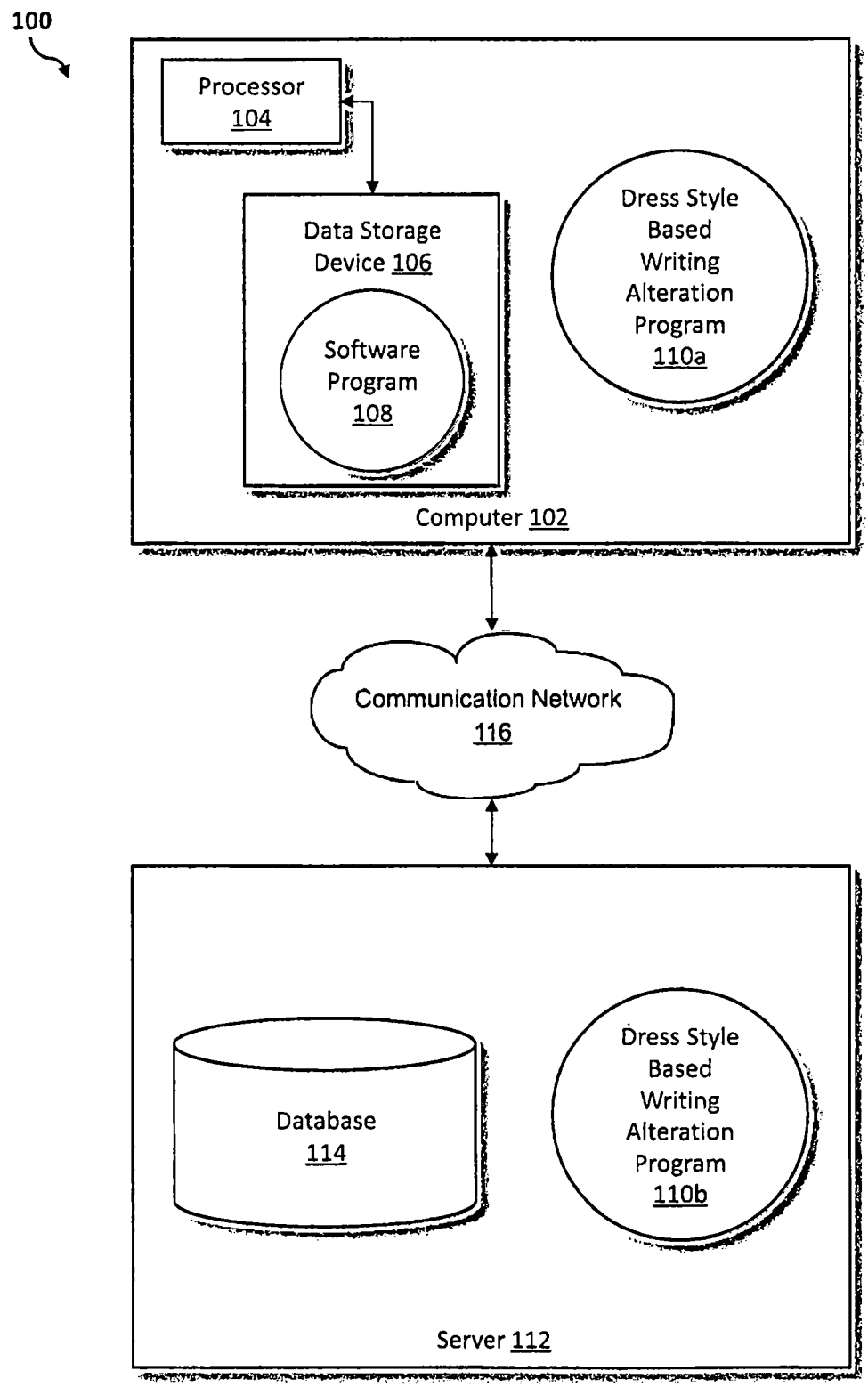
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for assisting with written communication style based on the dress style of the recipient. As such, the present embodiment has the capacity to improve the technical field of computational linguistics by analyzing data associated with a recipient's dress style to determine the recipient's writing style. Then, the dress style based writing alteration program makes recommendations or defines rules on a particular writing style in which to effectively communicate with the recipient by emails, text messages and other forms of written communication. More specifically, visual data, which were generated from the social media or photographs of the recipient, may be entered into an existing analysis engine, and the analysis engine categorizes the visual data into a dress style category. The dress style category may then be entered into the knowledge base, and the determined writing style of the recipient may be the output. The dress style based writing alteration program determines the writing styles of the person by analyzing the dress style category generated by the analysis engine. Depending on whether the user is a computer program or a human (i.e., not a computer program), the writing guidelines generated by the dress style based writing alteration program may either only define rules for written communication with recipient, or recommended alterations to the user's existing piece of written communication. If the user is a human, then the user may control whether recommendations are received simultaneously while the user drafts the piece of written communication, or at the completion of a drafting process. If the user is a human, then the user may also control whether to accept or reject any recommendations prior to sending the written communication to the recipient. The recommendations may include word and phrase choice, sentence fluency, tone and intentional misspellings. Furthermore, if the user is sending a non-digital form of written communication, such as a letter or card, the program may define rules for the communication.

As described previously, written communication has become a major, and, in many instances, exclusive form of communication in various settings, including the workplace. Therefore, it is important to effectively communicate to others, particularly unfamiliar recipients, in a way that is easily understood and received favorably by the recipient. If the user gains invaluable insight on the age, gender, personality, socioeconomic status, values and political ideologies of the recipient, then the user would be able to craft a more favorable and easily understood written communication to the recipient. As one of the most expressive forms of non-verbal communication, a recipient's dress style may serve as an indicator of the above attributes for a recipient.

Therefore, it may be advantageous to, among other things, provide writing style suggestions based on the dress style of the recipient, and enhance communication between computer programs, such as chatbots, and individuals.

According to at least one embodiment, there may be two forms of processing to the visual data. The first form of processing is the analysis engine, commonly used in other industries, such as the fashion industry, to categorize the dress style of the recipient based on visual data corresponding to the recipient. The identified dress style category generated from the analysis engine may be fed into the second form of processing, knowledge base, to determine analytics variables for the associated writing style. The knowledge base may be built to correlate dress style with writing style, and may identify key aspects of the recipient's writing style (e.g., formal, casual, use of colloquialisms, use of humor) that can assist with determining the appropriate writing style for a person with that particular dress style category. The knowledge base then correlates the results of both dress style and writing style, and these results are stored in the knowledge base.

According to at least one embodiment, the dress style based writing alteration program analyzes dress style category, associated with the social media feeds and photographs, to identify writing styles that would better appeal to the recipient. When the user prepares a written communication to recipient, the dress style based writing alteration program may apply natural language processing to identify elements that do not match the determined writing style, and either make recommendations to transform the written communication to more closely resemble the writing style of the recipient, or define rules for shaping the written communication. These recommendations or rules may be based on the correlation with the recipient's dress style rather than input from the user.

The present embodiment may include advising on writing style based on the determined dress style using image analysis and then identifying the corresponding written communication. The dress style based writing alteration program may advise on writing style, such as sentence fluency, word and phrase choice, tone and intentional misspellings, and the dress style based writing alteration program may be integrated into a previously existing software application for composing written communication, such as emails, text messages or non-digital written communication. According to at least one other embodiment, the dress style based writing alteration program may also be a separate program, not integrated into another software program, for written communication.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a dress style based writing alteration program 110a. The networked computer environment 100 may also include a server 112 that is enabled to run a dress style based writing alteration program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the dress style based writing alteration program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the dress style based writing alteration program 110a, 110b (respectively) to determine the writing style of a written communication based on the dress style of the recipient. The dress style based writing alteration method is explained in more detail below with respect to FIGS. 2 and 3.

Figure 2:
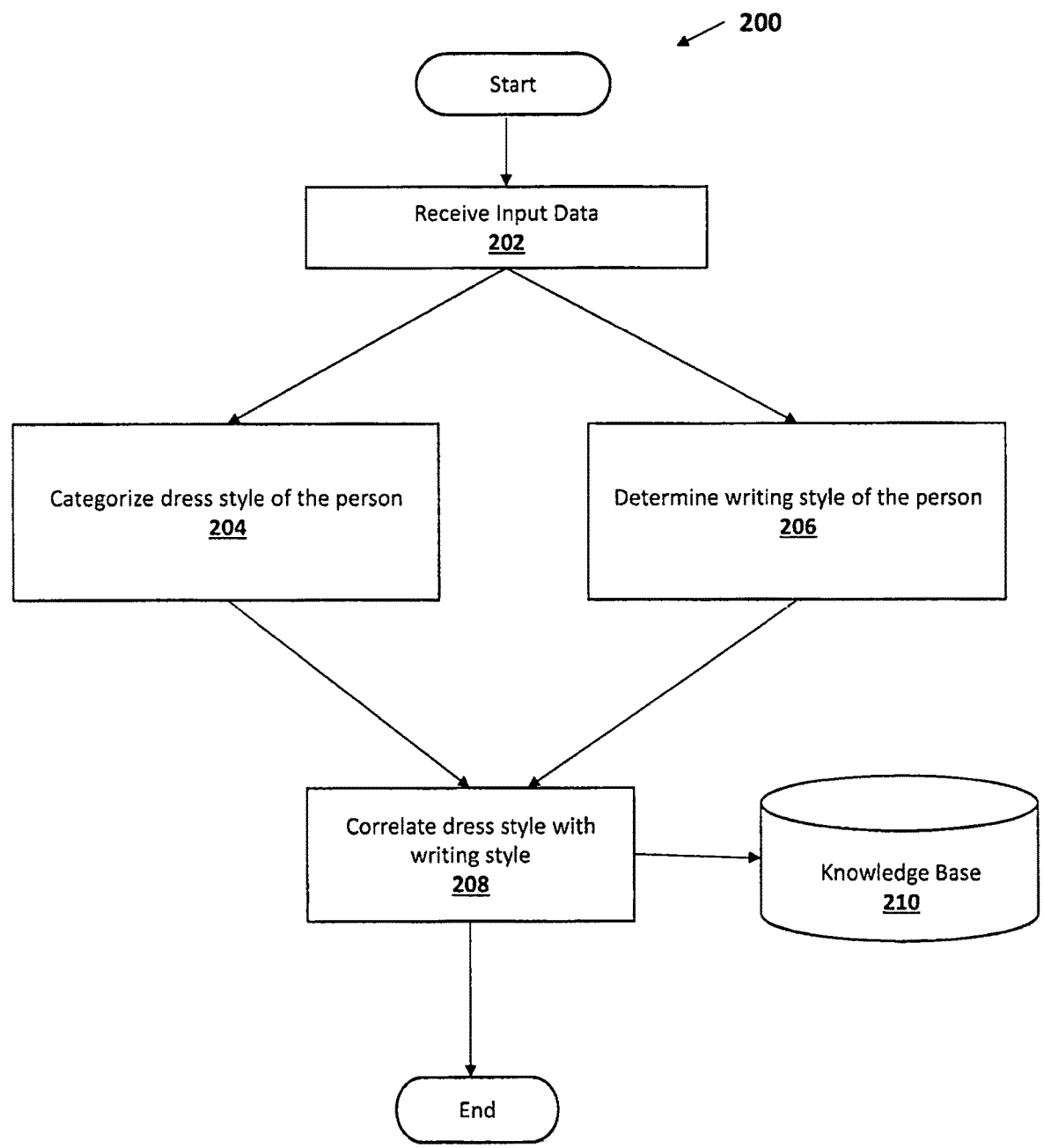
FIG. 2 is an operational flowchart illustrating a process for building the knowledge base to correlate dress style and writing style according to at least one embodiment.

Referring now to FIG. 2, an operational flowchart illustrating the exemplary knowledge base building process 200 used by the dress style based writing alteration program 110a and 110b according to at least one embodiment is depicted.

At 202, input data is received. Input data may include visual and textual data that may be utilized to build the knowledge base. Visual data (i.e., general visual data) may include photographs and social media data, which may be fed into the analysis engine to determine the dress style category (i.e., general dress style of a person). Alternatively, the dress style based writing alteration program 110a, 110b may search social media websites for pictures of the person. Textual data may include written communication, such as emails, publications or social media posts, which may be fed into the knowledge base to formulate the appropriate writing style for a person with a particular dress style category. For example, links for a person's social media pages may be received as input. Thereafter, social media pages are searched for pictures. The person's pictures from the social media pages are used to determine the recipient's dress style. Blog posts and publications from the person's social media pages may also be fed into the knowledge base as textual input.

Next, at 204, the dress style of the person is categorized using an analysis engine. The analysis engine, which is commonly known in other industries, such as the fashion industry, may analyze the visual data generated from a person's social media or photographs, and may categorize the dress style of the person based on the pictures inputted. Continuing the previous example, if the input pictures include the person wearing professional clothing, then the analysis engine may categorize the person's dress style as business professional.

Then, at 206, the writing style of the person (i.e., general writing style of the person) is determined by applying natural language processing to textual data associated with the person. To build the knowledge base, textual data (e.g., blog posts, publications, emails) from the person may be used to formulate the appropriate writing style for a particular dress category. Natural language processing may be applied to the textual data generated from the social media data and written communications to formulate the writing styles corresponding with a particular type of dress style category. Continuing the previous example, the blog posts, tweets and publications created by the person are processed to determine the appropriate writing style that corresponds with the business professional dress style. Natural language processing is utilized to identify word choices used in the person's social media blogs, and patterns in the sentence structure and tone. Therefore, the knowledge base building process 200 determines the writing style of the person.

Then, at 208, the dress style is correlated with the writing style of the person. The knowledge base building process 200 may correlate the dress style category and the determined writing style. Therefore, if any person has the same or similar dress style category, then the knowledge base building process 200 may correlate the dress style category with the previously determined writing style to establish the writing style for the new recipient. Then, the determined writing style with the corresponding dress style category may be stored in the knowledge base 210. The knowledge base 210 may improve and build more corresponding writing styles with each interaction of different dress style categories. Continuing the previous example, the business professional dress style is now associated with the writing style of the person. Data corresponding to the business professional dress style and the writing style of the person are stored in the knowledge base 210.

In another embodiment, the building of the knowledge base 210 may include the knowledge base 210 improving over time based on tracking the user's decision to accept or decline the later generated recommendations as will be described below with respect to FIG. 3. The knowledge base 210 may improve over time based on which recommendations the user decides may be appropriate for the recipients within that dress style category. Therefore, the dress style based writing alteration program 110a, 110b may be able to improve recommendations and writing style determinations over time.

Figure 3:
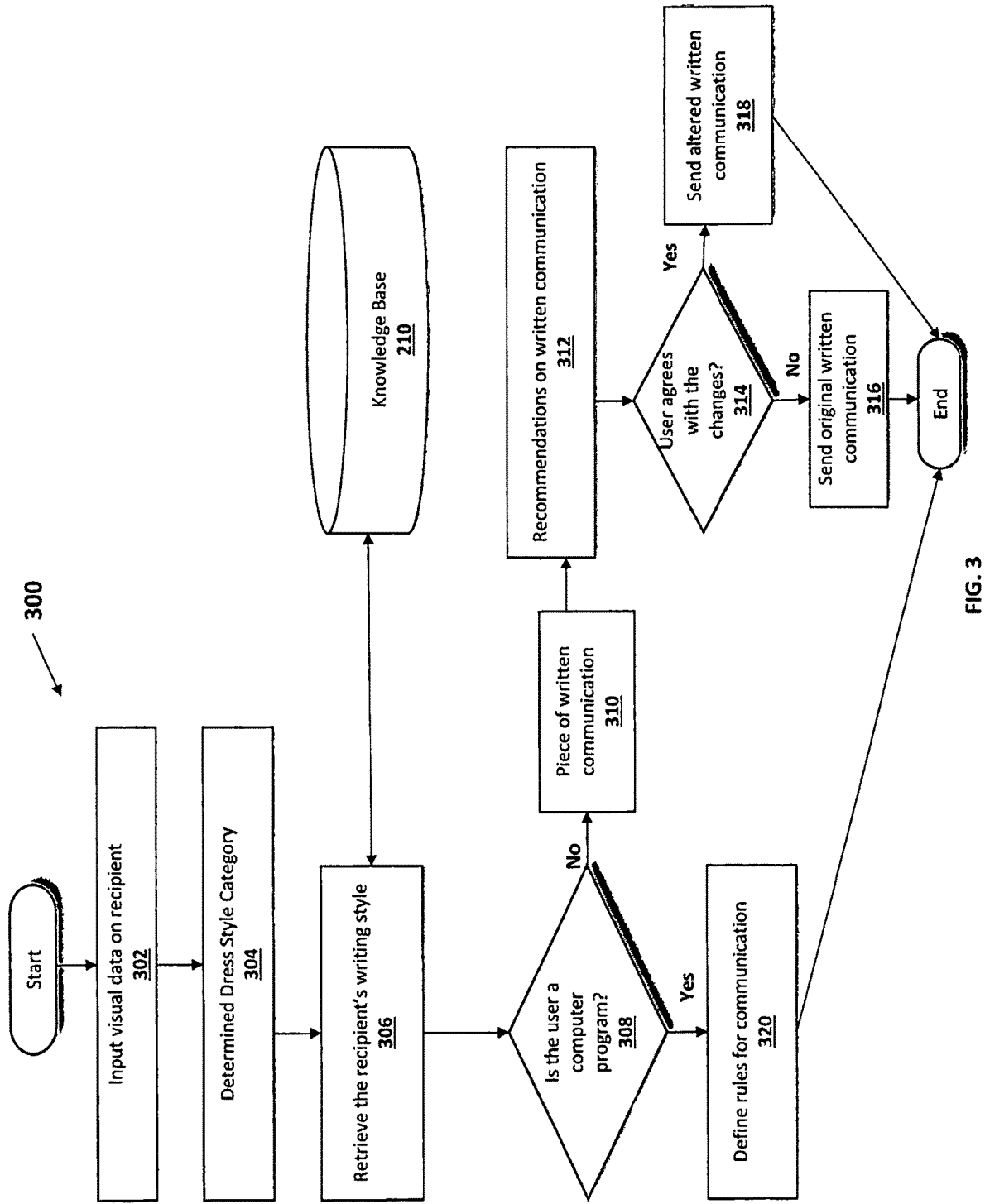
FIG. 3 is an operational flowchart illustrating a process for altering written communication based on the dress style of the recipient according to at least one embodiment.

Referring now to FIG. 3, an operational flowchart illustrating the exemplary process for altering written communication based on the dress style of the recipient 300 used by the dress style based writing alteration program 110a, 110b according to at least one embodiment is depicted.

At 302, visual data on the recipient is entered into analysis engine. Using a software program 108 on the user's device (e.g., user's computer 102), visual data may be received as input into the analysis engine. The visual data may include photographs of the recipient, limited social media sites (e.g., work-related sites or online directories), and popular social media sites. Prior to the analysis engine processing the visual data, the user may be able to accept or decline any visual data generated from the social media websites searches performed by the dress style based writing alteration program 110a, 110b. Alternatively, the user may also manually input photographs of the recipient without the use of social media data. At least one photograph of the recipient may be received as input into the analysis engine. For example, an employee contacts the company's Tech Support Division for the first time. Since the Tech Support representative is unfamiliar with this employee, the representative needs assistance to determine the appropriate writing style to respond to the employee's email inquiry. Since the company has an internal employee directory with the employee's profile, profile picture and links to the employee's popular social media profiles, the representative provides the employee's profile picture and social media links to the analysis engine. Since the analysis engine permits the representative to filter the pictures used to determine the dress style category, the representative may remove the employee's recent Halloween and wedding pictures from consideration. Therefore, the anomalous pictures are not used to determine the employee's dress style as the pictures may reduce the accuracy of the resulting analysis.

Next, at 304, the determined dress style category is received from the analysis engine. The analysis engine may be a commonly known engine that may analyze the photographs of a recipient, and determine the recipient's dress style based on the clothing worn by the recipient in the photographs. Using the visual data input from 302, the analysis engine may determine the recipient's dress style category. Continuing the previous example, the analysis engine may analyze the employee's social media data and the profile picture, and determine that the employee's dress style category is formal and professional.

Then, at 306, the writing style of the recipient is retrieved from the knowledge base 210. The determined dress style category from 304 may be used by the dress style based writing alteration program 110a, 110b to search for the writing style that corresponds to the recipient's dress style category. The dress style based writing alteration program 110a, 110b may then determine the recipient's writing style based on data corresponding to the dress style and writing style stored in the knowledge base 210. Recipients with similar dress style categories may have similar corresponding writing styles. Therefore, the writing style corresponding with the specific recipient's dress style may be retrieved as the output. Continuing the previous example, the formal and professional dress style category of the employee is used to search the knowledge base 210 to retrieve the writing style of the employee. Stored within the knowledge base 210 are previously analyzed people with a similar professional and formal dress style to this employee. Therefore, the dress style based writing alteration program 110a, 110b determines the recipient's writing style based on the writing style of people with a similar dress style category.

Then, at 308, the dress style based writing alteration program 110a, 110b determines if the user is a computer program, such as a chatbot. The user may be a human (i.e., not a computer program) who may be drafting the written communication via email, text message or non-digital form, or a computer program, such as a chatbot, who may be responding to the recipient's inquiry. Based on the response of the user, the dress style based writing alteration program 110a, 110b may change the form in which recommendations (i.e., writing guidelines) are made on writing style (i.e., define rules or scan piece of written communication). Continuing the previous example, the Tech Support representative may need to determine whether the response to the employee's inquiry will be through email directly to the employee, or through chatbot. If the representative responds through a chatbot, then the dress style based writing alteration program 110a, 110b may provide the representative with rules to follow for communication with the employee. If the representative decides to respond through email directly to the employee, then the dress style based writing alteration program 110a, 110b may make recommendations to alter the email drafted by the representative.

If the dress style based writing alteration program 110a, 110b determined that the user is not a computer program at

308, then the dress style based writing alteration program 110a, 110b will analyze a piece of written communication at 310. For written communication in digital form, the user may select whether to have the dress style based writing alteration program 110a, 110b simultaneously (i.e., in real-time) review the piece of written communication while the user may be drafting the communication, or to analyze the written communication after the user finished drafting the communication. To review the piece of written communication, the dress style based writing alteration program 110a, 110b may perform several scans of the communication during the drafting process, or one scan after the completion of the written communication. For simultaneous recommendations, the dress style based writing alteration program 110a, 110b may regularly scan the written communication, and the dress style based writing alteration program 110a, 110b may, in real time, make recommendations to alter the written communication based on the writing style retrieved from the knowledge base 210. If the user opts to receive recommendations after the written communication is completed, then there may be one scan of the entire written communication and all the recommendations may be made at one time. The dress style based writing alteration program 110a, 110b may make recommendations on the written communication based on the determined writing style from the knowledge base 210. Continuing the previous example, the Tech Support representative may select a real-time review of the email. Thereafter, the dress style based writing alteration program 110a, 110b may periodically perform scans while the representative drafts the email response to the employee. If the representative selected the review after the written communication is completed, then the dress style based writing alteration program 110a, 110b may perform one scan of the entire email after the draft of the email is completed.

Next, at 312, the dress style based writing alteration program 110a, 110b provides recommendations to alter the written communication. The dress style based writing alteration program 110a, 110b may apply natural language processing to analyze the communication being written to the recipient. The dress style based writing alteration program 110a, 110b may identify elements (i.e., word and phrase choice, tone, sentence fluency) within the communication that do not match with the recipient's style and may make recommendations that may convey the message in the appropriate writing style. For digital written communication, the recommendations may include word choice, phrase choice, sentence fluency, tone and intentional misspellings. Continuing the previous example, the dress style based writing alteration program 110a, 110b may have reviewed the Tech Support representative's email and provided real-time feedback as the representative drafted the email. The dress style based writing alteration program 110a, 110b recommended that the representative replace several colloquial phrases with more professional terms, change the friendly tone of the email to a more professional and formal tone, and change the sentence structure to conform with traditional grammar rules.

Then, at 314, the dress style based writing alteration program 110a, 110b determines if the user agrees with any of the recommended changes. After the dress style based writing alteration program 110a, 110b scans the written communication and identifies elements of the written communication that do not match the writing style of the recipient, the dress style based writing alteration program 110a, 110b may prompt the user, via a dialog box, to accept or decline each recommendation. The dialog box may include the recommended change, the reason for the recommendation, and "accept" and "decline" buttons next to the recommended change. Each recommendation may be evaluated individually by the user. Therefore, the user may decide to accept or decline any recommendation provided by the dress style based writing alteration program 110a, 110b. Accepted recommendations may be immediately incorporated in the written communication to the recipient, and declined recommendations may not be incorporated in the written communication. After the dress style based writing alteration program 110a, 110b has determined that the user has evaluated each recommended change, the dialog box may disappear and the user may continue to draft the written communication to the recipient. The dialog box may reappear after the dress style based writing alteration program 110a, 110b performs the next scan of the written communication. If the dress style based writing alteration program 110a, 110b has no recommendations to alter the written communication to transform the writing to more closely resemble the style of the recipient, then the dress style based writing alteration program 110a, 110b may not prompt the user that there are recommended changes, and the dialog box may not appear.

Continuing the previous example, after each scan of the written recommendation, the Tech Support representative was prompted by a dialog box that the dress style based writing alteration program 110a, 110b had recommended changes to the written communication. Each recommendation and a reason for each recommendation may be included in the dialog box along with "accept" and "decline" buttons for the Tech Support representative to indicate whether the Tech Support representative accepts or declines each recommendation. Each recommendation may be evaluated individually by the Tech Support representative. The Tech Support representative may not be required to accept or decline all the recommendations provided by the dress style based writing alteration program 110a, 110b. Instead, the Tech Support representative may accept or decline each recommendation based on whether, in the representative's opinion, the change may be appropriate. Only the accepted recommendations may be incorporated in the written communication to the recipient. After the Tech Support representative evaluated each of the recommendations, the dialog box may disappear and the Tech Support representative may continue to draft the written communication to the recipient. If the dress style based writing alteration program 110a, 110b has additional recommended changes, the dress style based writing alteration program 110a, 110b may prompt the Tech Support representative that the dress style based writing alteration program 110a, 110b may have recommended changes to the written communication after each scan of the written communication. If the dress style based writing alteration program 110a, 110b determines that the written communication matches the writing style of the recipient and has no recommendations to transform the written communication to more closely resemble the writing style of the recipient, then the dialog box may not appear after the dress style based writing alteration program 110a, 110b performs a scan on the written communication.

If the dress style based writing alteration program 110a, 110b determines that the user declines all the recommendations at 314, then the original written communication is sent to the recipient at 316. Any recommendations that are declined by the user may not be incorporated in the written communication. Therefore, the declined recommendations may not alter the written communication. Continuing the previous example, if the Tech Support representative did not agree with any of the recommendations, then the representative can decline to make any recommended changes to the email and send the original email to the employee.

However, if the dress style based writing alteration program 110a, 110b determines that the user accepts at least one recommendation at 314, then the written communication is altered accordingly and sent to the recipient with the accepted changes at 318. Only recommendations that are accepted by the user may be used to alter the written communication to transform the writing to more closely resemble the writing style of the recipient. Continuing the previous example, if the Tech Support representative accepted at least one of the recommendations, then the dress style based writing alteration program 110a, 110b may make only the recommended changes accepted by the user. The altered email, which the representative may send to the employee, may include only the accepted changes.

If the dress style based writing alteration program 110a, 110b determines that the user is a computer program (i.e., chatbot) at 308, then the dress style based writing alteration program 110a, 110b will define rules for altering the written communication to the computer program at 320. The computer program may use the rules to continue communication with the recipient, and to alter the continued communication to transform the writing to more closely resemble the style of the recipient. Continuing the previous example, if the Tech Support representative decided to communicate through a chatbot, then the dress style based writing alteration program 110a, 110b may provide the representative with a general list of rules for the determined writing styles, such as to avoid colloquialisms and follow traditional grammar rules regarding sentence structure and word spellings. These rules are used to alter the written communication from the chatbot to conform with the employee's dress style.

In another embodiment, the dress style based writing alteration program 110a, 110b may define rules for a written communication when the piece of written communication may be in non-digital form, such as a letter, card or mail, even though the user is a human. Since the dress style based writing alteration program 110a, 110b may not scan a piece of written communication that is not in digital form, the user may follow the rules for altering the written communication provided by the dress style based writing alteration program 110a, 110b to more closely resemble the writing style of the recipient. The rules may provide guidelines on how to draft the written communication in the determined writing style corresponding with the recipient's dress style category. The same rules for altering a written communication may be provided if the user was a computer program (i.e., chatbot) at 320.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
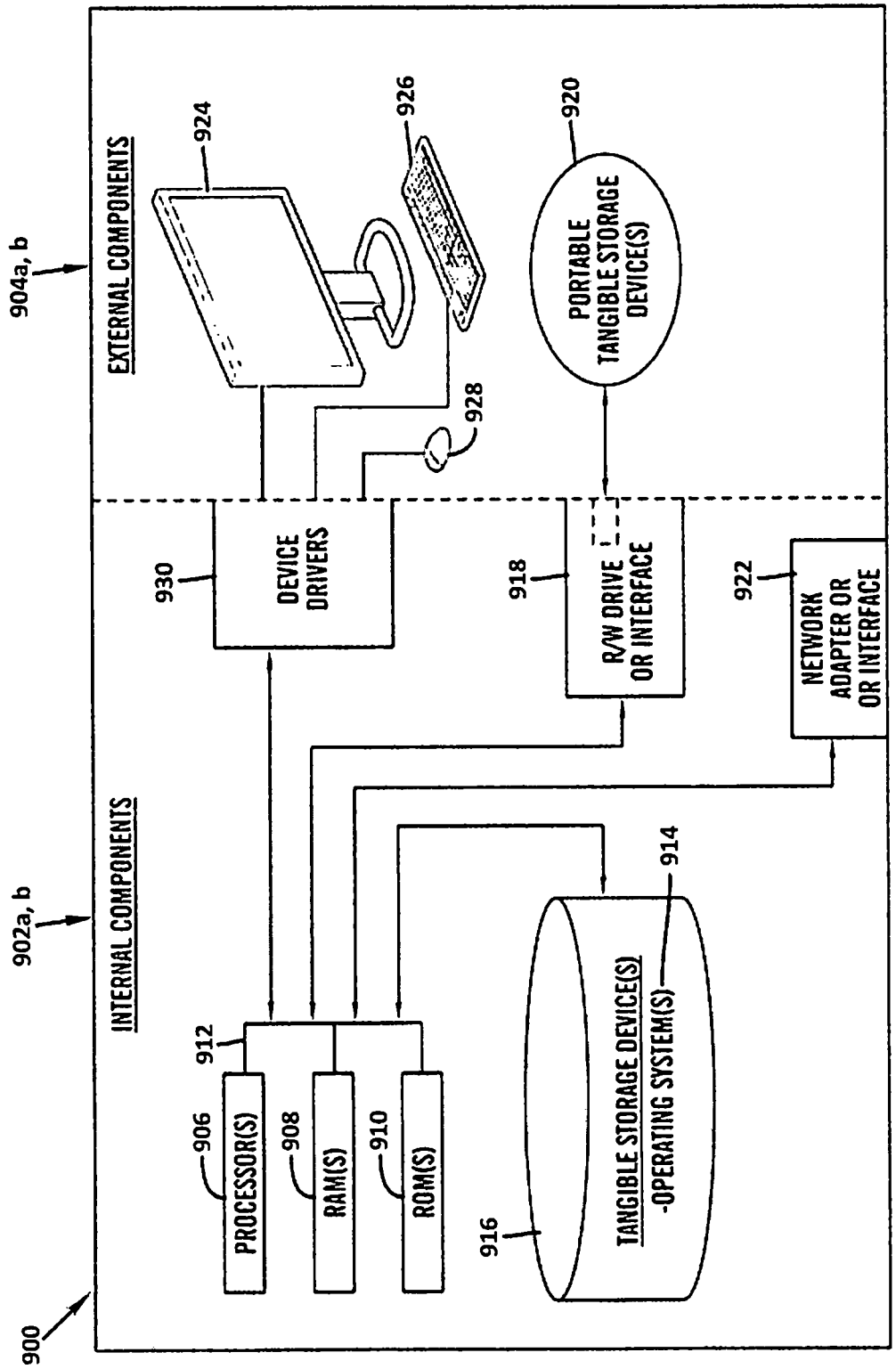
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the dress style based writing alteration program 110a in client computer 102, and the dress style based writing alteration program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the dress style based writing alteration program 110a and 110b can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the dress style based writing alteration program 110a in client computer 102 and the dress style based writing alteration program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the dress style based writing alteration program 110a in client computer 102 and the dress style based writing alteration program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
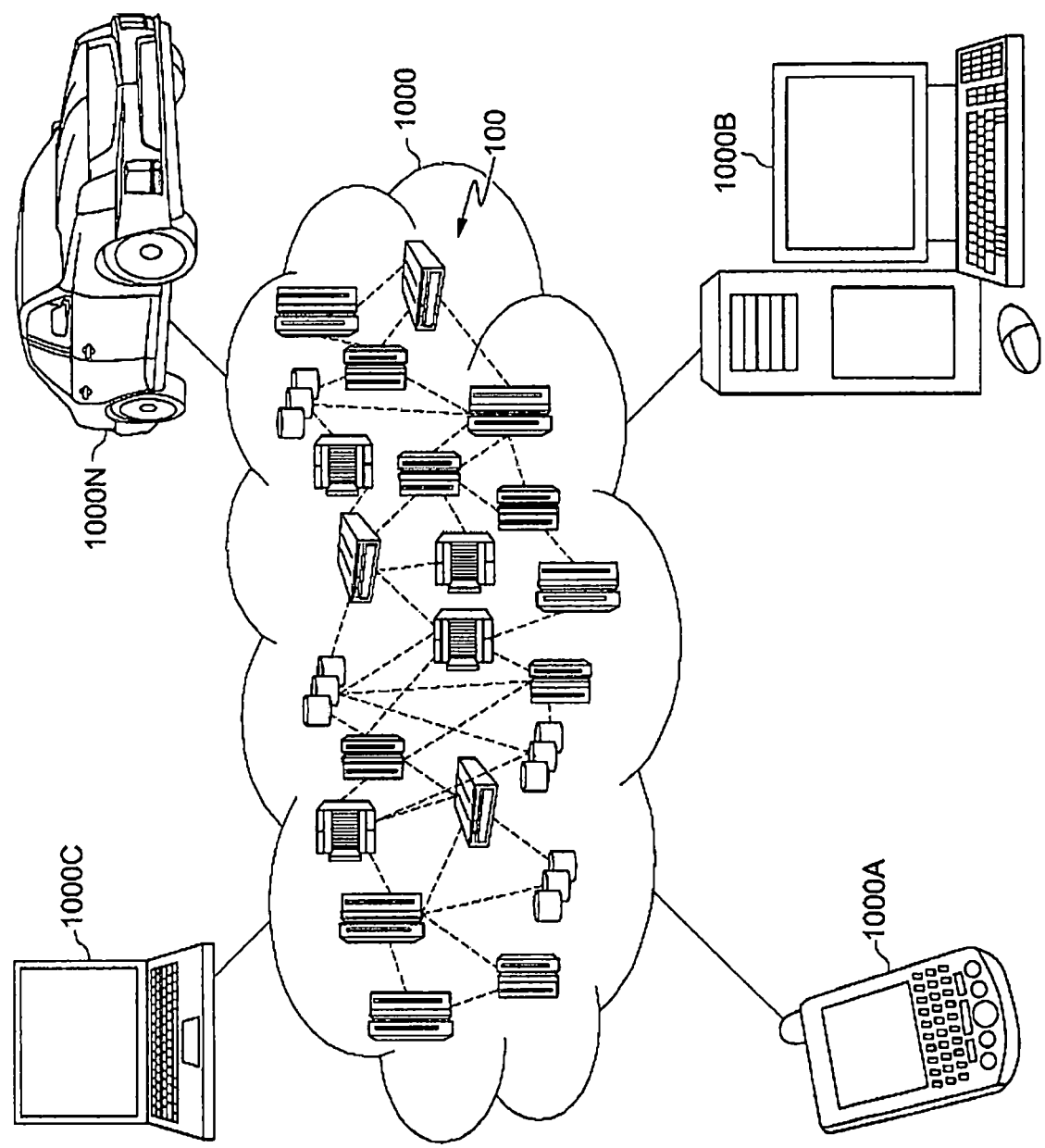
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
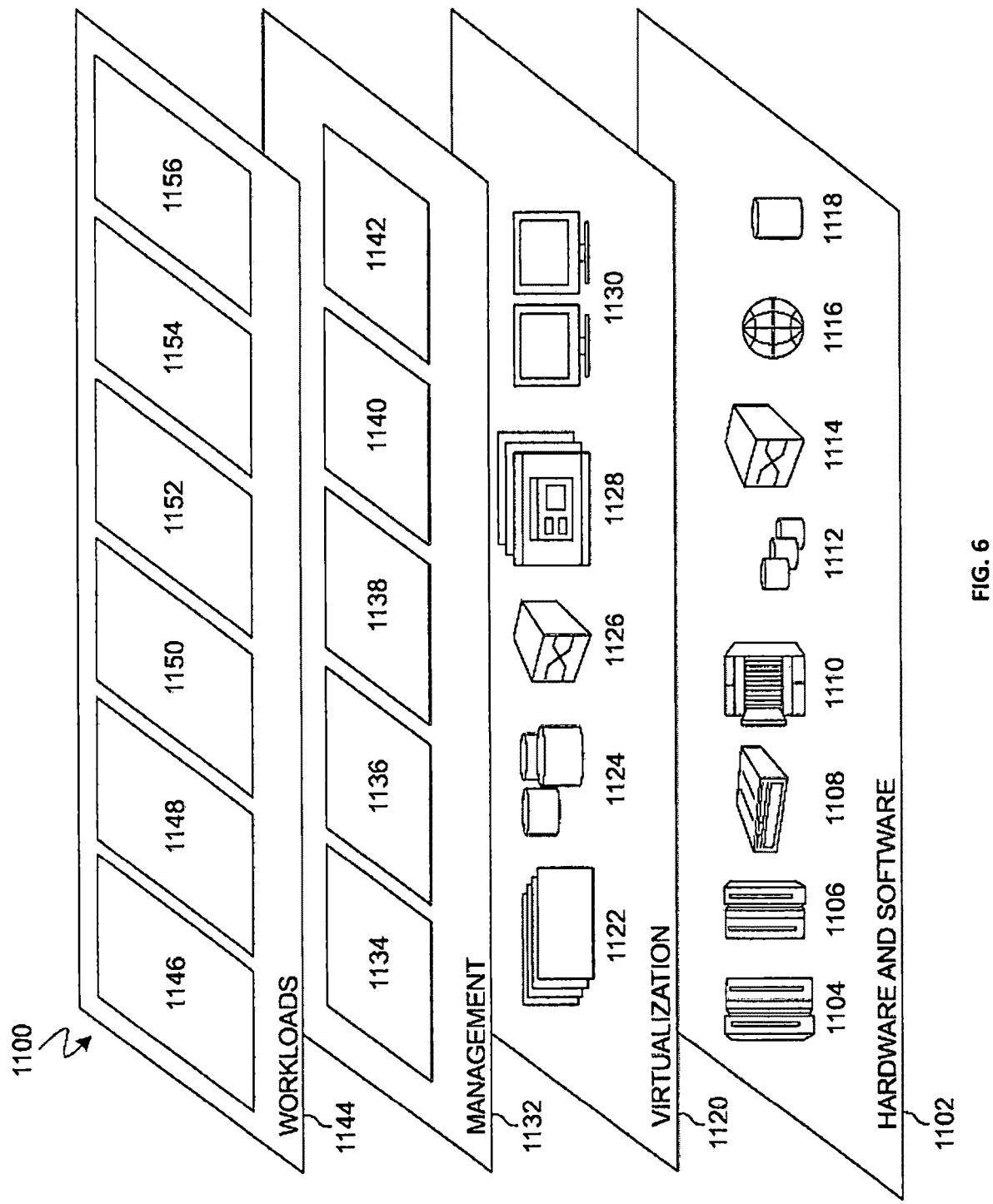
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and dress style based writing alteration 1156. A dress style based writing alteration program 110a, 110b provides a way to determine a favorable writing style for a written communication to a recipient based on the recipient's dress style.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for altering a written communication based on a dress style associated with a recipient, comprising:

one or more computer-readable storage media and program instructions stored on at least one of the one or more tangible storage media, the program instructions executable by a processor to cause the processor to perform a method comprising:

receiving a plurality of visual data associated with the recipient, wherein a user selects the received plurality of visual data by utilizing a plurality of social media websites and a plurality of photographs of the recipient, wherein the user determines the plurality of social media websites and the plurality of photographs that comprise the plurality of visual data associated with the recipient;

analyzing the received plurality of visual data;

determining the dress style associated with the recipient based on the analyzed plurality of visual data;

retrieving a writing style associated with the recipient based on the determined dress style stored in a knowledge base, wherein the knowledge base is built by receiving and analyzing a plurality of textual data and a plurality of visual data associated with the person;

wherein a general writing style associated with the person is determined based on the analyzed plurality of textual data and the analyzed plurality of visual data;

wherein the determined general dress style with the determined general writing style is associated with the person;

wherein the determined general dress style with the associated general writing style is stored in the knowledge base;

determining whether the written communication is in non-digital form, wherein the user receives a plurality of rules for the received written communication based on the retrieved writing style associated with the recipient; and determining whether a user is a computer program and the written communication is in digital form, wherein a computer program receives a plurality of rules for the received written communication based on the retrieved writing style associated with the recipient;

wherein the user is not a computer program and the written communication is in digital form, the user receiving the written communication generated by the user based on determining that the user is not the computer program, wherein the received written communication is analyzed by a plurality of scans for a plurality of recommended alterations based on the retrieved writing style, wherein the plurality of recommended alterations is generated, in real-time, for the received written communication based on the analyzed written communication;

wherein the user, in real-time, approved at least one recommended alteration within the generated plurality of recommended alterations; and wherein altering the written communication is received, in real-time, based on the approved at least one recommended alteration, wherein the altered written communication is stored and utilized by the knowledge base to refine a plurality of new recommendations and rules corresponding with a similar dress style of the recipient.

* * * * *